United States Patent [19]
Moon et al.

[11] Patent Number: 5,982,672
[45] Date of Patent: Nov. 9, 1999

[54] SIMULTANEOUS DATA TRANSFER THROUGH READ AND WRITE BUFFERS OF A DMA CONTROLLER

[75] Inventors: Kab Ju Moon, Cupertino; Amjad Z. Qureshi, San Jose, both of Calif.

[73] Assignee: Samsung Electronics Co., Ltd., Seoul, Rep. of Korea

[21] Appl. No.: 08/733,903

[22] Filed: Oct. 18, 1996

[51] Int. Cl.$^6$ .................................................. G11C 7/00
[52] U.S. Cl. ........................... 365/189.01; 365/189.05
[58] Field of Search .................................. 395/842, 846, 395/847; 365/189.05, 230.05

[56] References Cited

U.S. PATENT DOCUMENTS

| | | | |
|---|---|---|---|
| 4,787,033 | 11/1988 | Bomba et al. | 364/200 |
| 5,119,292 | 6/1992 | Baker et al. | 395/725 |
| 5,297,231 | 3/1994 | Miller | 395/2.1 |
| 5,404,480 | 4/1995 | Suzuki | 365/189.05 |
| 5,416,910 | 5/1995 | Moyer et al. | 395/325 |
| 5,418,967 | 5/1995 | Simcoe et al. | 395/725 |
| 5,475,850 | 12/1995 | Kahn | 395/290 |
| 5,506,971 | 4/1996 | Gullette et al. | 395/296 |
| 5,530,902 | 6/1996 | McRoberts et al. | 395/848 |
| 5,533,204 | 7/1996 | Tipley | 395/288 |
| 5,553,220 | 9/1996 | Keene | 395/154 |
| 5,555,425 | 9/1996 | Zeller et al. | 395/800 |
| 5,566,371 | 10/1996 | Ogawa | 365/230.05 |

(List continued on next page.)

OTHER PUBLICATIONS

Betty Prince, Semiconductor Memories, pp. 200–201, 1983.
"Am29200 Microprocessor Block Diagram", 2 pages, (date unknown).
"82C37A–5 CHMOS High Performance Programmable DMA Controller", Intel, Sep. (1988), pp. 3–33–3–50.
"KS0122 Product Brief", Samsung Electronics, Advace Information, pp. 1–8 (date unknown).
"KS0119 Data Sheet" Samsung Semiconductor, pp. 1–50 (Jul. 1995).
"Digital Video Interface Application Notes", pp. 1–19 and 51–54, Samsung Data Sheet (date unknown).
1996 Samsung Databook, "Multi Media IC", Samsung Electronics pp. 47–93 and 134–161, (Nov. 1995).
"Am2900 and Am29205 RISC Microcontrollers User's Manual", Advanced Micro Devices, pp. 11–1 through 11–15, (1994).
"Serial Port 16–Bit SoundComm Codec", Analog Device AD1843, pp. 20–25, (1996).
"Am2900 and Am29205 RISC Microcontrollers", Advanced Micro Devices, pp. 1–31, (1994).
PD8257 Programmable DMA Controller, NEC 1987 Microcomputer Products Data Book, vol. 2 of 2, pp. 8–79 through 8–89, (1987).
PD71071 DMA Controller, NEC 1987 Microcomputer Products Data Book, vol. 2 of 2, pp. 7–91 through 7–125, (1987).

Primary Examiner—David Nelms
Assistant Examiner—Michael T. Tran
Attorney, Agent, or Firm—Skjerven, Morrill, MacPherson, Franklin, & Friel

[57] ABSTRACT

A DMA controller has a first data buffer and a second data buffer. First data from a first bus can be loaded into the first data buffer at the same time that second data from a second bus is loaded into the second data buffer. Once the data is present in the first and second data buffers, the first data in the first data buffer can be supplied to the second bus at the same time that the second data in the second data buffer is supplied to the first bus (or alternatively to a third bus). In some embodiments, the second bus is a high speed parallel bus and the first and third data buses are I/O data buses for coupling the DMA controller to codecs. In some embodiments, data from the first data bus can be loaded into the first data buffer at the same time that data in the second data buffer is supplied to the third data bus. An address generator generates addresses onto the second data bus for the transfer of data between the DMA controller and the second data bus.

16 Claims, 2 Drawing Sheets

U.S. PATENT DOCUMENTS

| | | | |
|---|---|---|---|
| 5,574,868 | 11/1996 | Mariesetty | 395/298 |
| 5,586,248 | 12/1996 | Alexander et al. | 395/182.2 |
| 5,586,253 | 12/1996 | Green et al. | 395/185.06 |
| 5,621,897 | 4/1997 | Boury et al. | 395/296 |
| 5,630,077 | 5/1997 | Krein et al. | 395/293 |
| 5,634,040 | 5/1997 | Her et al. | 395/502 |
| 5,649,209 | 7/1997 | Umetsu et al. | 395/739 |
| 5,701,184 | 12/1997 | Motoyama | 358/450 |
| 5,706,417 | 1/1998 | Adelson | 395/129 |
| 5,706,419 | 1/1998 | Matsugu et al. | 395/135 |
| 5,749,093 | 5/1998 | Kabayashi et al. | 395/842 |

SIMULTANEOUS DATA TRANSFER THROUGH READ AND WRITE BUFFERS OF A DMA CONTROLLER

FIELD OF THE INVENTION

This invention relates to DMA (direct memory access) controller circuits.

BACKGROUND INFORMATION

FIG. 1 illustrates one possible multimedia system. Video data passes from camera 1, through video decoder 2, through DMA (direct memory access) controller 3, through bus 4, and to memory block 5. Video data also passes from memory block 5, through bus 4, through DMA controller 3, through video encoder 6, and to video display 7. Audio data passes from microphone 8, through an audio codec (encoder/decoder) 9, through DMA controller 3 through bus 4, and to memory block 5. Audio data also passes from memory block 5, through bus 4, through DMA controller 3 through bus 4, through audio codec 9, and to speaker 10. A processor 11 may, for example, process the data stored in memory block 5. The video data paths from the camera and to the display typically have high bandwidth requirements and in some applications, both the camera and the display are operational simultaneously. A high bandwidth multi-channel DMA controller for such multimedia applications is therefore sought.

SUMMARY

A DMA controller has a first data buffer and a second data buffer. First data from a first bus can be loaded into the first data buffer at the same time that second data from a second bus is loaded into the second data buffer. Once the data is present in the first and second data buffers, the first data in the first data buffer can be supplied to the second bus at the same time that the second data in the second data buffer is supplied the first bus (or alternatively to a third bus). In some embodiments, the second bus is a high speed parallel bus and the first and third data buses are I/O data buses for coupling the DMA controller to codecs. In some embodiments, data from the first data bus can be loaded into the first data buffer at the same time that data in the second data buffer is supplied to the third data bus. An address generator in the DMA controller generates addresses onto the second data bus for the transfer of data between the DMA controller and the second data bus. This summary does not purport to define the invention. The invention is defined by the claims.

DETAILED DESCRIPTION OF THE PREFERRED EMBODIMENTS

Figure 1:
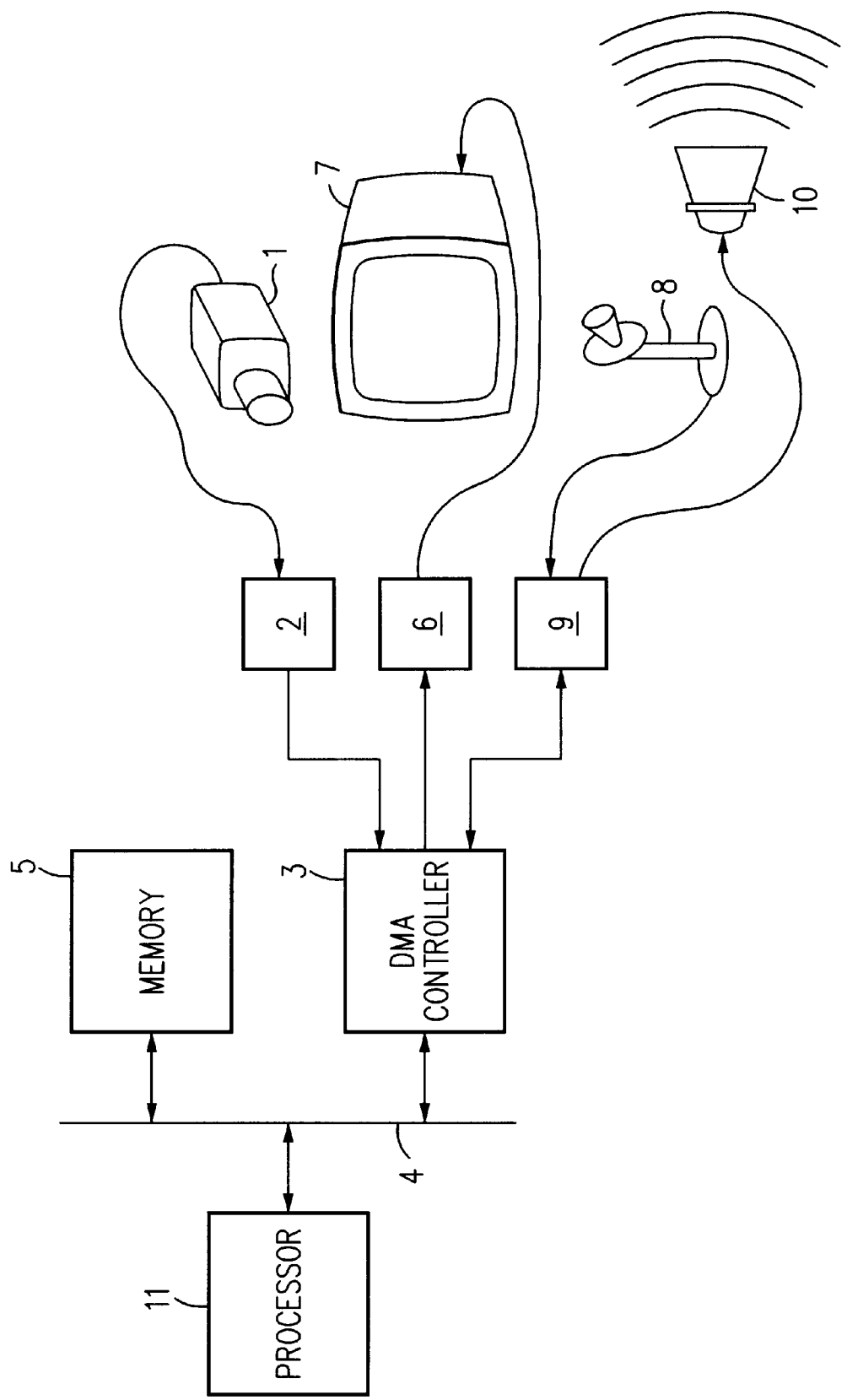
FIG. 1 illustrates a multimedia system wherein a camera and a video display coupled to a DMA controller are operational simultaneously.
Figure 2:
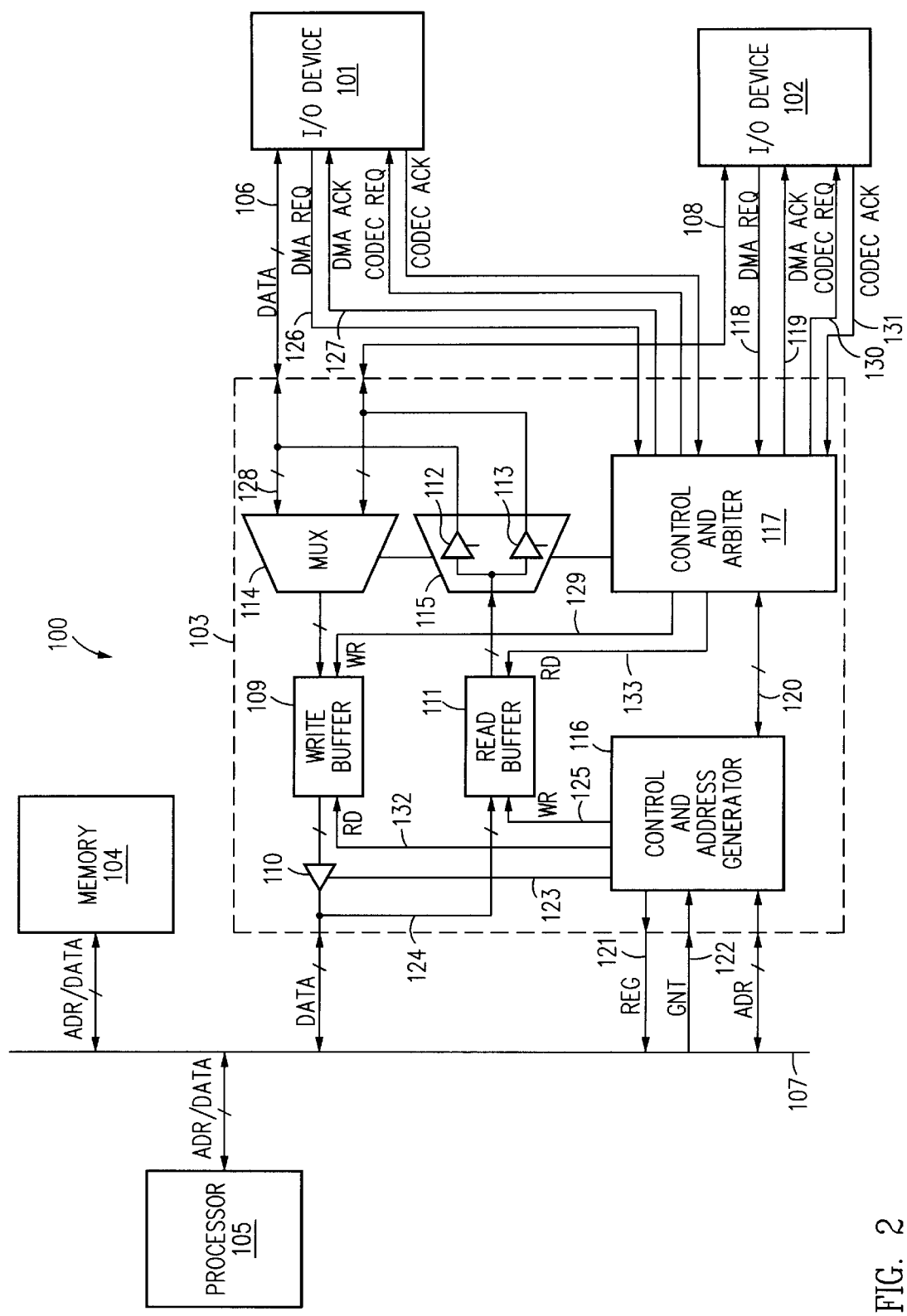
FIG. 2 is a simplified diagram of a system in accordance with the present invention wherein a DMA controller has both a read buffer and a write buffer.

FIG. 2 is a simplified diagram of a system 100 in accordance with the present invention. System 100 includes a first I/O device 101, a second I/O device 102, a DMA (direct memory access) controller 103, a memory block 104, a processor 105, a first parallel data bus 106, a second parallel data bus 107, and a third parallel data bus 108. The first data bus is considered a first DMA channel and the third data bus is considered a second DMA channel. DMA controller 103 includes a first data buffer 109, a first plurality of tri-statable buffers 110, a second data buffer 111, second and third pluralities of tri-statable buffers 112 and 113, a multiplexer 114, a control and address generator circuit 116, and a control and arbiter circuit 117.

Multiplexer 114 is a multibit channel multiplexer in the sense that each of the two channels through the multiplexer is a multibit channel. Tri-statable buffers 112 and 113 together comprise a multibit channel encoder 115. Which of the pluralities of tri-statable buffers 112 and 113 is enabled is controlled by a select input lead of encoder 115. I/O device 101 may, for example, include a video camera, a video decoder and a decoder interface block for interfacing the video decoder to first data bus 106. I/O device 102 may, for example, include a video display, a video encoder and an encoder interface block for interfacing the video encoder to third data bus 108. Data buffers 109 and 111 may, for example, be realized with FIFO (first-in-first-out) memories. Memory block 104 may, for example, include a memory control unit and SDRAM (synchronous dynamic random access memory) accessible through the memory control unit.

In accordance with some embodiments, it is possible for data to pass from one of busses 106 and 108 and into buffer 109 at the same time that data passes from bus 107 and into buffer 111. Such simultaneous data transfer facilitates high bandwidth data transfer operation through the DMA controller.

Consider the example where video data from memory block 104 is to be supplied to I/O device 102 and where video data from I/O device 101 is to be stored in memory block 104. I/O device 102 requests data by providing a DMA request signal on DMA request line 118 to control and arbiter circuit 117. In this case, I/O device 101 has not issued a DMA request. Control and arbiter circuit 117 determines that the DMA request of I/O device 102 will be serviced, issues a DMA acknowledge signal of I/O device 102 via DMA acknowledge line 119, and signals control and address generator circuit 116 via line 120 to cause data to be transferred from memory block 104 to DMA controller 103.

In some embodiments, control and address generator circuit 116 requests control of the second data bus 107 via bus request line 121, is granted control of second parallel bus 107 by a bus arbiter (not shown) via bus grant line 122, and issues a read request to a memory control unit in memory block 104. The memory control unit (not depicted) of memory block 104 responds by gaining control of bus 107 (using a similar bus request and bus grant) as a master and supplying the requested data onto second data bus 107. Control and address generator circuit 116 interfaces DMA controller 103 to second data bus 107 as a slave and controls tri-statable buffers 110 to be in their high impedance states via line 123 such that the requested data passes into buffer 111 via data bus lines 124. In embodiments where buffer 111 is a FIFO, the control and address generator circuit 116 controls a write pointer of buffer 111 via line 125.

At the same time that data is being loaded into buffer 111 from second bus 107, data from I/O device 101 can be loaded into buffer 109. I/O device 101 issues a DMA request via DMA request line 126. Control and arbiter circuit 117 determines that the DMA request of I/O device 101 will be serviced, issues a DMA acknowledge signal of I/O device 101 via DMA acknowledge line 127, controls the select input leads of multiplexer 114 to select the first data input leads 128 of the multiplexer 114, and controls the second plurality of tri-statable buffers 112 of encoder 115 to be in their high impedance states. Data then passes from I/O device 101, through first data bus 106, into the DMA controller circuit 103, through multiplexer 114, and into buffer 109. In the event that buffer 109 is a FIFO, control and arbiter circuit 117 controls a write pointer of buffer 109 via line 129.

Once data from memory block 104 is stored in buffer 111 and data from I/O device 101 is stored in buffer 109, the data in buffer 111 can be supplied to I/O device 102 and the data in buffer 109 can be supplied to memory block 104. Control and arbiter circuit 117 issues a codec request via line 130 to I/O device 102. When I/O device 102 is ready to receive data, I/O device 102 responds with a codec acknowledge signal via codec acknowledge line 131. Control and arbiter circuit 117 enables tri-stable buffers 113 of encoder 115 such that data passes from buffer 111, through enabled tri-statable buffers 113, through third data bus 108 and into I/O device 102. In the event that buffer 111 is a FIFO, control and arbiter circuit 117 controls a read pointer of buffer 111 via line 133.

At the same time that data is being transferred from buffer 111 to I/O device 102, data can be supplied from buffer 109 to memory block 104. Control and address generator circuit 116 obtains control of the second data bus 107 as a master (using the bus request and bus grant lines 121 and 122), enables first tri-statable buffers 110, and controls a read pointer of buffer 109 via line 132 such that the data from buffer 109 is loaded into memory block 104.

In the example of FIG. 2, the DMA controller circuit 103 supports two DMA channels, one to I/O device 101 and the other to I/O device 102. In some embodiments, there may be a first range of addresses in memory block 104 to which data from I/O device 101 is written and a second range of addresses in memory block 104 from which data in memory 104 is supplied to I/O device 102. Accordingly, control and address generator circuit 116 may include a current address register for the DMA channel of I/O device 101 and another current address register for the DMA channel of I/O device 102. The content of the current address register for a given DMA channel is incremented after a transfer of data through second bus 107.

In accordance with some embodiments, data can pass from I/O device 101, through first data bus 106, through multiplexer 114 and into data buffer 109 at the same time that other data passes from data buffer 111, through encoder 115, through third data bus 108, and into I/O device 102. In such a case, the select input leads of multiplexer 114 are controlled to select input leads 128 whereas the select input leads of encoder 115 are controlled to disable tri-statable buffers 112 and to enable tri-statable buffers 113. The select input of multiplexer 114 and encoder 115 are therefore controlled separately.

Although second bus 107 in the example above is a split transaction bus wherein DMA controller issues a read request (a posted read) as a master, relinquishes control of the second bus 107, and wherein memory block 104 gains control of the second bus 107 as a master and returns the requested data to the DMA controller, it is to be understood that numerous other different types of parallel buses can be used. DMA controller circuit 103 may, for example, simply read the data from the desired device on bus 107. I/O devices 101 and 102 need not include codecs or codec interfaces. Control and arbiter circuit 117 may implement any suitable arbitration scheme including, for example, a fixed priority scheme and/or a round robin priority scheme to determine which DMA request to handle first. Numerous different types of multiplexer structures, encoder structures and data buffer structures may be used. In some embodiments, first bus 106 and third bus 108 have sixty-four data lines, second bus 107 is a 100 MHz bus having sixty-four data lines and thirty-two address lines, write buffer 109 is sixty-four bits wide by four words deep, and read buffer 111 is sixty-four bits wide by four words deep.

For further details, see the following U.S. Patent Applications: "DMA Controller Which Receives Size Data For Each DMA Channel", by Amjad Qureshi, et al., U.S. patent application Ser. No. 08/733,411, filed Oct. 18, 1996; "DMA Controller With Channel Tagging" by Kab Ju Moon, et al., U.S. patent application Ser. No. 08/730,611, filed Oct. 18, 1996; "Shared Bus System With Transaction And Destination ID", by Amjad Qureshi, et al., U.S. patent application Ser. No. 08/731,393, filed Oct. 18, 1996; "Full Duplex Serial Codec Interface With DMA Access", by Hoyoung Kim, U.S. patent application Ser. No. 08/730,864, filed Oct. 18, 1996; and "Video Interface And Overlay System And Process", by Hoyoung Kim, U.S. patent application Ser. No. 08/733,905, filed Oct. 18, 1996. The subject matter of the five applications listed above is incorporated herein by reference.

Although the present invention is described in connection with certain specific embodiments for instructional purposes, the present invention is not limited thereto. The DMA controller can support one DMA channel or multiple DMA channels. Accordingly, various modifications, adaptations, and combinations of various features of the described embodiments can be practiced without departing from the scope of the invention as set forth in the claims.

What is claimed is:

1. An integrated circuit, comprising:
    a first multiple word data buffer having a plurality of data input leads and a plurality of data output leads, said plurality of data input leads being coupled to a plurality of first bus data lines, said plurality of output leads being selectively couplable to a plurality of second bus data lines;
    a second multiple word data buffer having a plurality of data input leads and a plurality of data output leads, said plurality of data input leads being coupled to said plurality of second bus data lines, said plurality of output leads being selectively couplable to said plurality of first bus data lines; and
    a control and address generator circuit coupled to said first data buffer, said second data buffer, and a second bus of which said plurality of second bus data lines are part.

2. The integrated circuit of claim 1, further comprising:
    a plurality of tri-statable buffers, said plurality of output leads of said first data buffer being selectively couplable to said plurality of second bus data lines through said tri-statable buffers.

3. The integrated circuit of claim 1, further comprising:
    a multibit channel multiplexer, said plurality of input leads of said first data buffer being coupled to said plurality of first bus data lines via said multibit channel multiplexer.

4. The integrated circuit of claim 3, wherein said multibit channel multiplexer has a first plurality of input leads, a second plurality of input leads, a plurality of output leads, and a select input lead, said first plurality of input leads being coupled to said plurality of first bus data lines, said plurality of output leads being coupled to said plurality of input leads of said first data buffer.

5. The integrated circuit of claim 1, further comprising a processor coupled to said second bus.

6. An integrated circuit, comprising:
a first multiple word data buffer having a plurality of data input leads and a plurality of data output leads, said plurality of data input leads being coupled to a plurality of first bus data lines, said plurality of output leads being selectively couplable to a plurality of second bus data lines;
a second multiple word data buffer having a plurality of data input leads and a plurality of data output leads, said plurality of data input leads being coupled to said plurality of second bus data lines, said plurality of output leads being selectively couplable to said plurality of first bus data lines;
a control and address generator circuit coupled to said first data buffer, said second data buffer, and a second bus of which said plurality of second bus data lines are part; and
a multibit channel multiplexer, said plurality of input leads of said first data buffer being coupled to said plurality of first bus data lines via said multibit channel multiplexer, wherein said plurality of output leads of said second data buffer are selectively couplable to said plurality of first bus data lines via a multibit channel encoder.

7. The integrated circuit of claim 6, wherein said encoder has a plurality of input leads, a first plurality of output leads, a second plurality of output leads, and a select input lead, said plurality of input leads of said encoder being coupled to said data output leads of said second multiple word data buffer, said first plurality of output leads of said encoder being coupled to said plurality of first bus data lines.

8. The integrated circuit of claim 6, further comprising:
a control and arbiter circuit coupled to a select input lead of said multiplexer and to a select input lead of said encoder.

9. An integrated circuit, comprising:
a first multiple word data buffer having a plurality of data input leads and a plurality of data output leads, said plurality of data input leads being coupled to a plurality of first bus data lines, said plurality of output leads being selectively couplable to a plurality of second bus data lines;
a second multiple word data buffer having a plurality of data input leads and a plurality of data output leads, said plurality of data input leads being coupled to said plurality of second bus data lines, said plurality of output leads being selectively couplable to said plurality of first bus data lines; and
a control and address generator circuit coupled to said first data buffer, said second data buffer, and a second bus of which said plurality of second bus data lines are part, wherein said control and address generator circuit generates a bus request signal and receives a bus grant signal to arbitrate for said second bus.

10. The integrated circuit of claim 9, further comprising:
a plurality of tri-statable buffers, said plurality of data output leads of said first data buffer being selectively couplable to said plurality of second bus data lines through said tri-statable buffers.

11. The integrated circuit of claim 9, further comprising:
a multibit channel multiplexer, said plurality of data input leads of said first data buffer being coupled to said plurality of first bus data lines via said multibit channel multiplexer.

12. The integrated circuit of claim 11, wherein said multibit channel multiplexer has a first plurality of input leads, a second plurality of input leads, a plurality of output leads, and a select input lead, said first plurality of input leads being coupled to said plurality of first bus data lines, said plurality of output leads being coupled to said plurality data input leads of said first data buffer.

13. The integrated circuit of claim 9, further comprising a processor coupled to said second bus.

14. The integrated circuit of claim 9, wherein first data is transferred from said first bus data lines and into said first multiple word data buffer at the same time that second data is transferred from said second bus data lines and into said second multiple word data buffer, and wherein said first data is transferred from said first multiple word data buffer and onto said second bus data lines at the same time that said second data is transferred from said second multiple word data buffer and onto said first bus data lines.

15. The integrated circuit of claim 9, said first multiple word data buffer comprising a first-in-first-out memory, said second multiple word data buffer comprising a first-in-first-out memory.

16. An integrated circuit, comprising:
first parallel data bus lines;
second parallel data bus lines;
a processor coupled to said second parallel data bus lines;
a memory coupled to said second parallel data bus lines;
third parallel data bus lines;
a first multiple word data buffer having a plurality of data input leads and a plurality of data output leads, said plurality of data input leads being selectively couplable to either said first parallel data bus lines or said third parallel data bus lines, said plurality of output leads being selectively couplable to said second parallel data bus lines, said first multiple word data buffer comprising a first-in-first-out memory;
a second multiple word data buffer having a plurality of data input leads and a plurality of data output leads, said plurality of data input leads being coupled to said second parallel data bus lines, said plurality of data output leads being selectively couplable to either said first parallel data bus lines or said third parallel data bus lines, said second multiple word data buffer comprising a first-in-first-out memory;
a multiplexer, said plurality of input leads of said first data buffer being selectively couplable to either said first parallel data bus lines or said third parallel data bus lines via said multiplexer; and
a control circuit coupled to said first data buffer, said second data buffer, said second parallel data bus lines and said multiplexer, said control circuit controlling a read pointer of said first multiple word data buffer, controlling a write pointer of said first multiple word data buffer, controlling a read pointer of said second multiple word data buffer, and controlling a write pointer of said second multiple word data buffer.

* * * * *